(12) United States Patent
Tasaka et al.

(10) Patent No.: US 9,493,714 B2
(45) Date of Patent: Nov. 15, 2016

(54) METHOD FOR PRODUCING HYDROCARBON OIL AND SYSTEM FOR PRODUCING HYDROCARBON OIL

(75) Inventors: Kazuhiko Tasaka, Tokyo (JP); Yuichi Tanaka, Tokyo (JP); Marie Iwama, Tokyo (JP)

(73) Assignees: JAPAN OIL, GAS, AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 63 days.

(21) Appl. No.: 13/817,182

(22) PCT Filed: Aug. 12, 2011

(86) PCT No.: PCT/JP2011/068476
§ 371 (c)(1),
(2), (4) Date: Feb. 15, 2013

(87) PCT Pub. No.: WO2012/023525
PCT Pub. Date: Feb. 23, 2012

(65) Prior Publication Data
US 2013/0144099 A1  Jun. 6, 2013

(30) Foreign Application Priority Data

Aug. 19, 2010 (JP) ................................. 2010-184083

(51) Int. Cl.
*C10G 67/00* (2006.01)
*C10G 47/00* (2006.01)
(Continued)

(52) U.S. Cl.
CPC ................. *C10G 67/00* (2013.01); *C10G 2/00* (2013.01); *C10G 2/342* (2013.01); *C10G 3/56* (2013.01);
(Continued)

(58) Field of Classification Search
CPC ............ C10G 2/00; C10G 2/32; C10G 2/33; C10G 2/342; C10G 7/00; C10G 7/12; C10G 47/00; C10G 67/00; C10G 67/02; C10G 67/16; C10G 31/09; C10G 2300/1022; C10G 2300/208
USPC ......... 208/92, 100, 108, 308, 347, 349, 950; 73/53.01, 61.71, 61.73, 64.56
See application file for complete search history.

(56) References Cited

U.S. PATENT DOCUMENTS 5,827,903 A * 10/1998 White ...................... B01J 38/48
 252/373
6,068,760 A *  5/2000 Benham ................. C10G 2/342
 208/950

(Continued)

FOREIGN PATENT DOCUMENTS

AU  2009224349  9/2009
CA  2 718 173  9/2009
(Continued)

OTHER PUBLICATIONS

Marcus N. Allhands, PhD., PE, It's Time to Rethink Cooling Tower Filtration, 2005 Annual Conference, Feb. 26-Mar. 3, 2005.*
(Continued)

*Primary Examiner* — Prem C Singh
*Assistant Examiner* — Brandi M Doyle
(74) *Attorney, Agent, or Firm* — Greenblum & Bernstein, P.L.C.

(57) ABSTRACT

Hydrocarbon oil obtained by Fischer-Tropsch (FT) synthesis reaction using a catalyst within a slurry bed reactor is fractionated into a distilled oil and a column bottom oil in a rectifying column, part of the column bottom oil is flowed into a first transfer line that connects a column bottom of the rectifying column to a hydrocracker, at least part of the column bottom oil is flowed into a second transfer line branched from the first transfer line and connected to the first transfer line downstream of the branching point, the amount of the catalyst fine powder to be captured is monitored while the catalyst fine powder in the column bottom oil that flows in the second transfer line are captured by a detachable filter provided in the second transfer line, and the column bottom oil is hydrocracked within the hydrocracker.

5 Claims, 1 Drawing Sheet

(51) Int. Cl.

| | | |
|---|---|---|
| *C10G 65/18* | (2006.01) | |
| *C10G 2/00* | (2006.01) | |
| *C10G 67/02* | (2006.01) | |
| *C10G 67/16* | (2006.01) | |
| *C10G 3/00* | (2006.01) | |
| *C10G 31/00* | (2006.01) | |

(52) U.S. Cl.
 CPC ............... *C10G 31/00* (2013.01); *C10G 47/00* (2013.01); *C10G 65/18* (2013.01); *C10G 67/02* (2013.01); *C10G 67/16* (2013.01); *C10G 2300/1022* (2013.01); *C10G 2300/208* (2013.01); *Y02P 30/20* (2015.11)

(56) References Cited

U.S. PATENT DOCUMENTS

| | | | |
|---|---|---|---|
| 6,124,367 | A | 9/2000 | Plecha et al. |
| 6,866,797 | B1* | 3/2005 | Martin et al. ............ 252/389.23 |
| 7,488,760 | B2 | 2/2009 | Vogel |
| 2004/0132835 | A1 | 7/2004 | Gamlin et al. |
| 2005/0004239 | A1 | 1/2005 | Bull et al. |
| 2005/0004412 | A1* | 1/2005 | Moore et al. ................. 585/802 |
| 2006/0144755 | A1* | 7/2006 | Benazzi et al. ............... 208/108 |
| 2007/0014703 | A1 | 1/2007 | Schweitzer et al. |
| 2007/0197667 | A1 | 8/2007 | Vogel |
| 2010/0239474 | A1 | 9/2010 | Onishi |
| 2011/0036753 | A1 | 2/2011 | Tasaka |
| 2011/0044859 | A1 | 2/2011 | Onishi et al. |
| 2011/0190403 | A1 | 8/2011 | Onishi et al. |
| 2011/0281960 | A1 | 11/2011 | Tasaka |
| 2013/0143971 | A1 | 6/2013 | Iwama et al. |

FOREIGN PATENT DOCUMENTS

| | | |
|---|---|---|
| CA | 2 737 881 | 4/2010 |
| CA | 2738043 | 4/2010 |
| CN | 1822896 | 8/2006 |
| CN | 201218256 | 4/2009 |
| EP | 2261306 | 12/2010 |
| JP | S54-154873 | 12/1979 |
| JP | 2000-265178 | 9/2000 |
| JP | 2002-502686 A | 1/2002 |
| JP | 2004-323626 A | 11/2004 |
| JP | 2006-22283 | 1/2006 |
| JP | 2007-530710 A | 11/2007 |
| JP | 4340389 | 7/2009 |
| JP | 2009-221299 A | 10/2009 |
| JP | 2009-221301 | 10/2009 |
| JP | 2009-221305 A | 10/2009 |
| WO | 99/39825 | 8/1999 |
| WO | 2009-041600 | 4/2009 |
| WO | 2009-113613 | 9/2009 |
| WO | 2010/038400 A1 | 4/2010 |

OTHER PUBLICATIONS

International Preliminary Report on Patentability for Application No. PCT/JP2011/068481, mailed on Mar. 28, 2013.
Search Report from International Application No. PCT/JP2011/068481, mail date is Nov. 8, 2011.
International Preliminary Report on Patentability Application No. PCT/JP2011/068476, mail date is Mar. 28, 2013.
Search report from International Application No. PCT/JP2011/068476, mail date is Oct. 18, 2011.
Search Report for EP Application No. 11818169.2, which was mailed on Apr. 1, 2014.
European Office Action in respect to European Application No. 11 818 167.6, dated Jan. 4, 2016.

* cited by examiner

METHOD FOR PRODUCING HYDROCARBON OIL AND SYSTEM FOR PRODUCING HYDROCARBON OIL

TECHNICAL FIELD

The present invention relates to a method for producing a hydrocarbon oil and a system for producing a hydrocarbon oil.

BACKGROUND ART

Recently, from the viewpoint of reduction in environmental load, clean and eco-friendly liquid fuels in which the contents of sulfur and aromatic hydrocarbons are small have been demanded. From such a viewpoint, as a technique for producing a raw material hydrocarbon in order to produce a fuel oil base material that contains no sulfur or aromatic hydrocarbons and is rich in aliphatic hydrocarbons, particularly, a kerosene and light oil base material, a method using a Fischer-Tropsch synthesis reaction (hereinafter, referred to as the "FT synthesis reaction" in some cases) in which carbon monoxide gas and hydrogen gas are used as the raw material has been examined.

Moreover, a technique in which a synthesis gas whose principal component is carbon monoxide gas and hydrogen gas is produced by reforming of a gaseous hydrocarbon raw material such as natural gas, a hydrocarbon oil (hereinafter, referred to as the "FT synthetic oil" in some cases) is synthesized from the synthesis gas by the FT synthesis reaction, and further, through an upgrading step that is a step of hydrogenating and refining the FT synthetic oil to produce a variety of liquid fuel oil base materials, the kerosene and light oil base material and naphtha or wax and the like are produced is known as a GTL (Gas To Liquids) process (see the following Patent Literature 1, for example.).

As a synthesis reaction system that synthesizes the hydrocarbon oil by the FT synthesis reaction, for example, a bubble column type slurry bed FT synthesis reaction system that blows a synthesis gas into a slurry, in which a solid catalyst (hereinafter, referred to as the "FT synthesis catalyst" in some cases) particle having activity to the FT synthesis reaction is suspended in the hydrocarbon oil, to make the FT synthesis reaction is disclosed (see the following Patent Literature 2, for example.).

As a bubble column type slurry bed FT synthesis reaction system, for example, an external circulating system including a reactor that accommodates a slurry to make the FT synthesis reaction, a gas feeder that blows the synthesis gas into a bottom of the reactor, an outflow pipe that evacuates from the reactor the slurry containing the hydrocarbon oil obtained by the FT synthesis reaction within the reactor, a catalyst separator that separates the slurry evacuated through the outflow pipe into the hydrocarbon oil and the FT synthesis catalyst particle, and a re-introducing pipe that re-introduces the FT synthesis catalyst particle and part of the hydrocarbon oil separated by the catalyst separator into the reactor is known.

CITATION LIST

Patent Literature

[Patent Literature 1] Japanese Patent Application Laid-Open Publication No. 2004-323626

[Patent Literature 2] U.S. Patent Application Laid-Open Publication No. 2007/0014703

SUMMARY OF INVENTION

Technical Problem

The catalyst separator in the bubble column type slurry bed FT synthesis reaction system includes a filter whose opening is approximately 10 µm, for example. The FT synthesis catalyst particle in the slurry is captured by the filter to be separated from the hydrocarbon oil.

However, part of the FT synthesis catalyst particles are gradually reduced to a fine powder due to friction between the FT synthesis catalyst particles, friction with an inner wall or the like of the reactor, or thermal damage caused by the FT synthesis reaction. The fine powder whose particle size becomes smaller than the size of the opening of the filter in the catalyst separator (hereinafter, referred to as the "catalyst fine powder" in some cases) may unintendedly pass through the filter with the hydrocarbon oil to flow into a reaction system in the upgrading step of the FT synthetic oil. The flow of the catalyst fine powder into the reaction system causes deterioration in the catalyst used in the reaction system, increase in pressure loss of the reactor, and further, reduction in quality of liquid fuel base materials and liquid fuel products. However, it is difficult to provide a filter having an opening smaller than the particle size of the catalyst fine powder in a flow path in which the FT synthetic oil obtained by the FT synthesis reaction flows at a large flow rate, thereby to capture the catalyst fine powder, because pressure loss in the filter is large, and the pressure loss is further increased by capturing of the catalyst fine powder. Further, in the conventional method, it is difficult to accurately capture the state of the catalyst fine powder flowing into the upgrading step. Namely, because mixing of the catalyst fine powder in the FT synthetic oil is an event in which mixing of a slight amount of the catalyst fine powder continues for a long time, and the amount of the catalyst fine powder to be mixed fluctuates over time, it is difficult to capture the state of mixing quantitatively with high precision by a method for periodically sampling the FT synthetic oil to determine the content of the catalyst fine powder. Particularly, it is difficult to capture the amount of the catalyst fine powder to flow into the upgrading step as a cumulative amount with respect to a lapse of time with high reliability. For this reason, it is difficult to predict the occurrence of problems depending on the amount of the catalyst fine powder to be accumulated in the reaction system in the upgrading step, and take a precautionary measure based on the prediction.

The present invention has been made in consideration of the problems above, and an object of the present invention is to provide a method for producing a hydrocarbon oil and a production system in which without having a large influence on operation of an apparatus for producing a hydrocarbon oil, the amount of a catalyst fine powder to flow into a reaction system in an upgrading step used in the Fischer-Tropsch synthesis reaction can be quantitatively monitored with high precision, and the occurrence of problems in the reaction system in the step can be predicted.

Solution to Problem

In order to achieve the object above, a method for producing a hydrocarbon oil according to the present invention comprises: a step of obtaining a hydrocarbon oil containing a catalyst fine powder derived from a catalyst by a Fischer-Tropsch synthesis reaction using a slurry bed reactor in which the catalyst is suspended in a liquid hydrocarbon; a step of fractionating the hydrocarbon oil into at least one distilled oil and a column bottom oil containing the catalyst fine powder using a rectifying column; a step of flowing at least part of the column bottom oil through a second transfer line to capture the catalyst fine powder in the column bottom oil flowing through the second transfer line by a detachable filter while flowing the remaining column bottom oil through a first transfer line to transfer the column bottom oil to a hydrocracker in a transfer device comprising the first transfer line that connects a column bottom of the rectifying column to the hydrocracker, and the second transfer line branched from a branching point of the first transfer line, provided with the filter halfway, and connected to the first transfer line downstream of the branching point; a step of monitoring an amount of the catalyst fine powder captured by the filter; and a step of hydrocracking the column bottom oil in the hydrocracker.

By the method for producing a hydrocarbon oil according to the present invention, without having a large influence on operation of an apparatus for producing a hydrocarbon oil, the amount of a catalyst fine powder to flow into a reaction system in an upgrading step used in the Fischer-Tropsch synthesis reaction can be quantitatively monitored with high precision, and the occurrence of problems in the reaction system in the step can be predicted.

In the method for producing a hydrocarbon oil according to the present invention, it is preferable that the ratio F2/F1 of the mass flow rate F2 of the column bottom oil to be transferred by the second transfer line to the mass flow rate F1 of the column bottom oil to be transferred by the first transfer line be 0.01 to 0.2.

At a ratio F2/F1 of 0.01 to 0.2, the detachable filter provided halfway of the second transfer line can be small-sized, and replacement or the like of the filter can easily be performed. Here, the "mass flow rate F1 of the column bottom oil to be transferred by the first transfer line" refers to a mass flow rate of the column bottom oil in the first transfer line between the branching point of the second transfer line branched from the first transfer line and a merging point of the second transfer line with the first transfer line.

The system for producing a hydrocarbon oil according to the present invention includes a rectifying column for fractionating a hydrocarbon oil obtained by a Fischer-Tropsch synthesis reaction using a slurry bed reactor, in which a catalyst is suspended in a liquid hydrocarbon, into at least one distilled oil and a column bottom oil; a hydrocracker for hydrocracking the column bottom oil; a first transfer line connecting a column bottom of the rectifying column to the hydrocracker; and a second transfer line branched from a branching point of the first transfer line, provided with a detachable filter for capturing a catalyst fine powder derived from a catalyst halfway, and connected to the first transfer line downstream of the branching point.

According to the system for producing a hydrocarbon oil according to the present invention, the method for producing a hydrocarbon oil according to the present invention can be implemented.

In the system for producing a hydrocarbon oil according to the present invention, it is preferable that the first transfer line and the second transfer line include a flow meter.

The first transfer line and the second transfer line each include a flow meter; thereby, from the amount of the catalyst fine powder captured for a predetermined period by the filter provided in the second transfer line and a cumulative amount of a fluid flowed for the period through the first transfer line and that through the second transfer line, the amount of the catalyst fine powder flowed into the hydrocracker for the period can be estimated.

In the system for producing a hydrocarbon oil according to the present invention, it is also preferable that the second transfer line include a device that measures a differential pressure before and after the filter provided in the second transfer line.

The second transfer line includes the device that measures a differential pressure before and after the filter provided in the second transfer line; thereby, the amount of the catalyst fine powder captured by the filter can be estimated in the state where the filter is mounted on the second transfer line.

Advantageous Effects of Invention

According to the present invention, the method for producing a hydrocarbon oil and the production system can be provided in which without having a large influence on operation of an apparatus for producing a hydrocarbon oil, the amount of the catalyst fine powder derived from the catalyst used for the Fischer-Tropsch synthesis reaction to flow into the reaction system in the upgrading step of the FT synthetic oil can be quantitatively captured with high precision, and the occurrence of problems in the reaction system in the step can be predicted.

DESCRIPTION OF EMBODIMENTS

Figure 1:
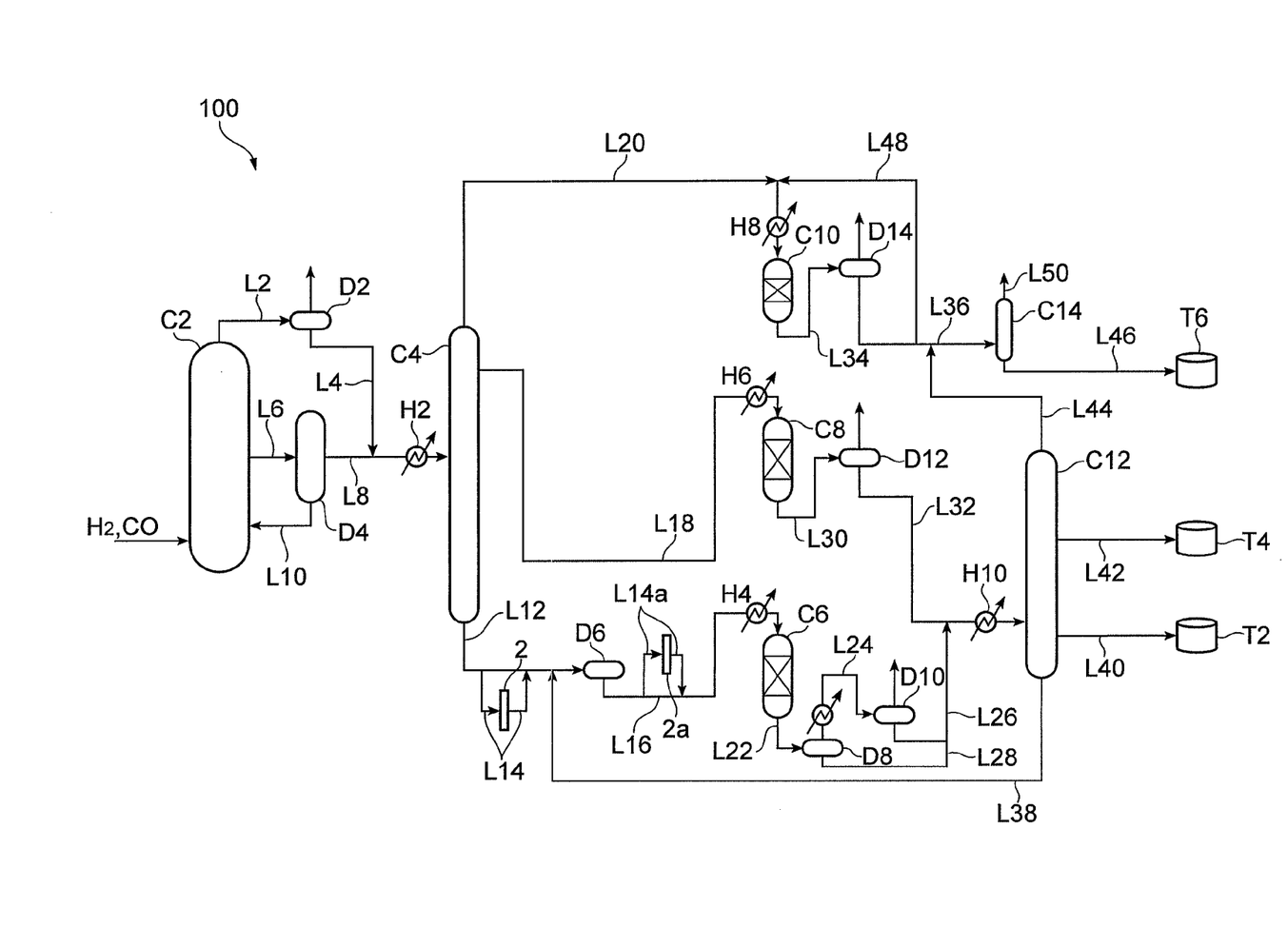
FIG. 1 is a schematic view of a system for producing a hydrocarbon oil according to one embodiment of the present invention.

Hereinafter, with reference to FIG. 1, a method for producing a hydrocarbon oil using a system for producing a hydrocarbon oil and a production system according to one embodiment of the present invention will be described in detail. Same reference numerals will be given to same or identical components.

(Outline of System for Producing Hydrocarbon Oil)

A system 100 for producing a hydrocarbon oil used in the present embodiment is a plant facility for performing a GTL process that converts a hydrocarbon raw material such as natural gas into a liquid fuel (hydrocarbon oil) base material such as light oil, kerosene, and naphtha. The system 100 for producing a hydrocarbon oil according to the present embodiment mainly includes a reformer (not shown), a bubble column type slurry bed reactor C2, a first rectifying column C4, first transfer lines L12 and L16, a second transfer line L14, a filter 2, a hydrocracker C6, an intermediate fraction hydrorefining apparatus C8, a naphtha fraction hydrorefining apparatus C10, and a second rectifying column C12. The line L12 that forms the first transfer line connects the first rectifying column C4 to a mixing drum D6. The line L16 that forms the first transfer line connects a mixing drum D2 to the hydrocracker C6. The "line" means a piping for transferring a fluid.

(Outline of Method for Producing Hydrocarbon Oil)

A method for producing a hydrocarbon oil using the production system 100 comprises the following steps S1 to S8.

In Step S1, in the reformer (not shown), natural gas as the hydrocarbon raw material is reformed to produce a synthesis gas containing carbon monoxide gas and hydrogen gas.

In Step S2, in the bubble column type slurry bed reactor C2, by the FT synthesis reaction using an FT synthesis catalyst, a hydrocarbon oil (FT synthetic oil) is synthesized from the synthesis gas obtained in Step S1. In Step S2, a catalyst fine powder may be produced from part of the FT synthesis catalyst, and part of the catalyst fine powder may pass through the filter, which separates the hydrocarbon oil from the FT synthesis catalyst particles, to be mixed in the FT synthetic oil to be fed to Step. S3 described below.

In Step S3, in the first rectifying column C4, the FT synthetic oil obtained in Step S2 is fractionated into at least one distilled oil and a column bottom oil containing the catalyst fine powder. In the present embodiment, by the fractionation, the FT synthetic oil is separated into a crude naphtha fraction, a crude intermediate fraction, and a crude wax fraction. Here, the crude naphtha fraction and crude intermediate fraction are distilled oils each obtained by condensing a product once vaporized from the FT synthetic oil in the first rectifying column C4, and evacuating the products from the column top of the first rectifying column C4 and the column middle thereof, respectively; the crude wax fraction is a column bottom oil evacuated as it is a liquid from the column bottom without vaporization from the FT synthetic oil. The column bottom oil may contain the catalyst fine powder produced in Step S2 and mixed in the FT synthetic oil. The crude naphtha fraction, the crude intermediate fraction, and the crude wax fraction each refer to a fraction obtained by fractionation of the FT synthetic oil and not subjected to a hydrorefining or hydrocracking treatment.

The steps subsequent to Step S4 to be described below comprise the upgrading step of the FT synthetic oil. In Step S4, the crude wax fraction that is the column bottom oil in the first rectifying column C4 separated in Step S3 and contains the catalyst fine powder is transferred from the first rectifying column C4 to the hydrocracker C6. The crude wax fraction is transferred through a transfer device including the first transfer lines L12 and L16 that connect the column bottom of the first rectifying column C4 to the hydrocracker C6, and the second transfer line L14 branched from the branching point of the first transfer line L12, provided with the detachable filter 2 halfway, and connected to the first transfer line L12 downstream of the branching point. In transfer, at least part of the crude wax fraction flows through the second transfer line, and the catalyst fine powder contained therein is captured by the detachable filter 2 provided halfway of the second transfer line L14. Further, Step S4 comprises the step of monitoring the amount of the catalyst fine powder to be captured by the filter 2.

In Step S5, in the hydrocracker C6, hydrocracking of the crude wax fraction separated in Step S3 and transferred in Step S4 is performed.

In Step S6, in the intermediate fraction hydrorefining apparatus C8, hydrorefining of the crude intermediate fraction is performed.

In Step S7, in the naphtha fraction hydrorefining apparatus C10, hydrorefining of the crude naphtha fraction is performed. Further, the hydrorefined naphtha fraction is fractionated in a naphtha stabilizer C14 to recover naphtha (GTL-naphtha) that is a product of the GTL process.

In Step S8, a mixture of the hydrocracking product of the crude wax fraction and the hydrorefined product of the crude intermediate fraction is fractionated in the second rectifying column C12. By the fractionation, a light oil (GTL-light oil) base material and a kerosene (GTL-kerosene) base material that are products of the GTL process are recovered.

Hereinafter, Steps S1 to S8 will be described more in detail.

(Step S1)

In Step S1, first, a sulfur compound contained in natural gas is removed by a desulfurization apparatus (not shown). Usually, the desulfurization apparatus includes a hydrogenation desulfurization reactor filled with a known hydrogenation desulfurization catalyst and an adsorptive desulfurization apparatus provided at the rear stage thereof and filled with an adsorptive material for hydrogen sulfide such as zinc oxide. The natural gas is fed to the hydrogenation desulfurization reactor with hydrogen, and the sulfur compound in the natural gas is converted into hydrogen sulfide. Subsequently, in the adsorptive desulfurization apparatus, hydrogen sulfide is removed by adsorption, and the natural gas is desulfurized. By the desulfurization of the natural gas, poisoning of a reforming catalyst filled in the reformer, the FT synthesis catalyst used in Step S2, and the like by the sulfur compound is prevented.

The desulfurized natural gas is fed to reforming using carbon dioxide and steam in the reformer to produce a synthesis gas at a high temperature containing carbon monoxide gas and hydrogen gas as principal components. The reforming reaction of the natural gas in Step S1 is represented by reaction equations (1) and (2). The reforming method is not limited to the steam carbon dioxide gas reforming method using carbon dioxide and steam; for example, a steam reforming method, a partial oxidation reforming method (PDX) using oxygen, an autothermal reforming method (ATR) that is a combination of the partial oxidation reforming and the steam reforming method, a carbon dioxide gas reforming method, or the like can also be used.

$$CH_4 + H_2O \longrightarrow CO + 3H_2 \quad (1)$$

$$CH_4 + CO_2 \longrightarrow 2CO + 2H_2 \quad (2)$$

(Step S2)

In Step S2, the synthesis gas produced in Step S1 is fed to the bubble column type slurry bed reactor C2, and hydrocarbon is synthesized from hydrogen gas and carbon monoxide gas in the synthesis gas.

The bubble column type slurry bed FT reaction system including the bubble column type slurry bed reactor C2 mainly includes the bubble column type slurry bed reactor C2 that accommodates a slurry containing the FT synthesis catalyst, a gas feeder that blows the synthesis gas into the bottom of the reactor (not shown), a line L2 that evacuates the gaseous hydrocarbon obtained by the FT synthesis reaction and the non-reacted synthesis gas from the column top of the bubble column type slurry bed reactor C2, a gas liquid separator D2 that cools the gaseous hydrocarbon and non-reacted synthesis gas evacuated from the line L2, and separates the substance fed from the line L2 into gas and liquid, an outflow pipe L6 that evacuates the slurry containing hydrocarbon oil from the reactor, a catalyst separator D4 that separates the slurry evacuated through the outflow pipe L6 into the hydrocarbon oil and the FT synthesis catalyst particles, and a re-introducing pipe L10 that re-introduces the FT synthesis catalyst particles and part of the hydrocarbon oil separated by the catalyst separator D4 into the reactor C2, for example. Inside of the bubble column type slurry bed reactor C2, a heat conducting pipe (not shown) for removing the reaction heat generated by the FT synthesis reaction, through which cool water is flowed, is provided.

As the FT synthesis catalyst used in the bubble column type slurry bed reactor C2, a known carrier type FT synthesis catalyst in which an active metal is supported by an inorganic carrier is used. As the inorganic carrier, porous oxides such as silica, alumina, titania, magnesia, and zirconia are used; silica or alumina is preferable, and silica is more preferable. Examples of the active metal include cobalt, ruthenium, iron, and nickel; cobalt and/or ruthenium is preferable, and cobalt is more preferable. The amount of the active metal to be supported is preferably 3 to 50% by mass, and more preferably 10 to 40% by mass based on the mass of the carrier. In the case where the amount of the active metal to be supported is less than 3% by mass, the activity tends to be insufficient; in the case where the amount of the active metal to be supported is more than 50% by mass, the activity tends to be reduced by aggregation of the active metal. Other than the active metal, other components may be supported in the FT synthesis catalyst in order to improve the activity or control the number of carbon atoms of hydrocarbon to be produced and distribution thereof. Examples of the other component include a compound containing a metal element such as zirconium, titanium, hafnium, sodium, lithium, and magnesium. It is preferable that the average particle size of the FT synthesis catalyst particle be 40 to 150 μm so that the catalyst particles may easily flow within the slurry bed reactor as a slurry suspended in the liquid hydrocarbon. It is also preferable that from the viewpoint of the fluidity as the slurry, the shape of the FT synthesis catalyst particle be spherical.

The active metal is supported by a carrier by a known method. Examples of the compound containing the active metal element used for supporting can include salts of mineral acid of an active metal such as nitric acid salts, hydrochloric acid salts, and sulfuric acid salts; salts of organic acid such as formic acid, acetic acid, and propionic acid; and complexes such as acetylacetonate complexes. The supporting method is not particularly limited, and an impregnation method represented by an Incipient Wetness method using a solution of a compound containing an active metal element is preferably used. The carrier by which the compound containing the active metal element is supported is dried by a known method, and more preferably fired under an air atmosphere by a known method. The firing temperature is not particularly limited, and usually approximately 300 to 600° C. By firing, the compound containing the active metal element on the carrier is converted into metal oxide.

For the FT synthesis catalyst in order to demonstrate high activity to the FT synthesis reaction, it is necessary that the active metal atom be converted into a metal by reduction treatment of the catalyst in which the active metal atom is oxidized. The reduction treatment is usually performed by contacting the catalyst with reducing gas under heating. Examples of the reducing gas include hydrogen gas, gases containing hydrogen gas such as a mixed gas of hydrogen gas and an inert gas such as nitrogen gas, and carbon monoxide gas; preferable is hydrogen containing gas, and more preferable is hydrogen gas. The temperature in the reduction treatment is not particularly limited, and it is preferable that it be usually 200 to 550° C. At a reduction temperature less than 200° C., the active metal atom tends not to be sufficiently reduced and not to sufficiently demonstrate the catalyst activity; at a temperature more than 550° C., the catalyst activity tends to be reduced due to aggregation of the active metal or the like. The pressure in the reduction treatment is not particularly limited, and it is preferable that it be usually 0.1 to 10 MPa. At a pressure less than 0.1 MPa, the active metal atom tends not to be sufficiently reduced and not to sufficiently demonstrate the catalyst activity; at a pressure more than 10 MPa, facility cost tends to be increased for a need to increase pressure resistance of the apparatus. The time of the reduction treatment is not particularly limited, and it is preferable that it be usually 0.5 to 50 hours. At a reduction time less than 0.5 hours, the active metal atom tends not to be sufficiently reduced and not to sufficiently demonstrate the catalyst activity; at a reduction time more than 50 hours, the catalyst activity tends to be reduced due to aggregation of the active metal or the like, and the efficiency tends to be reduced. The facility in which the reduction treatment is performed is not particularly limited; for example, the reduction treatment may be performed in the absence of liquid hydrocarbon within the reactor to perform the FT synthesis reaction. The reduction treatment may also be performed within a facility connected to the reactor to perform the FT synthesis reaction, and the catalyst may be transferred through a piping to the reactor to perform the FT synthesis without contacting the catalyst with the air.

On the other hand, in the case where the reduction treatment is performed in a facility located in a place different from that of the facility to perform the FT synthesis reaction such as a catalyst production facility, the catalyst activated by the reduction treatment is deactivated if the catalyst is contacted with the air during transportation or the like. In order to prevent this, the activated catalyst is subjected to a stabilization treatment to prevent deactivation caused by contact with the air. Examples of the stabilization treatment include a method for performing a light oxidation treatment on an activated catalyst to form an oxidation coating on the surface of an active metal so as not to further progress oxidation due to contact with the air, or a method for coating an activated catalyst with hydrocarbon wax or the like in the absence of the air to block contact with the air. In the method for forming an oxidation coating, the catalyst can be fed to the FT synthesis reaction as it is after transportation; in the method for performing coating with wax or the like, when the catalyst is suspended in a liquid hydrocarbon to form a slurry, the wax or the like used for coating is dissolved in liquid hydrocarbon, and the activity is demonstrated.

The reaction condition on the FT synthesis reaction in the bubble column type slurry bed reactor C2 is not limited; for example, the following reaction condition is selected. Namely, it is preferable that the reaction temperature be 150 to 300° C. from the viewpoint of increase in the conversion rate of carbon monoxide and the number of carbon atoms of hydrocarbon to be produced. It is preferable that the reaction pressure be 0.5 to 5.0 MPa. It is preferable that a hydrogen/carbon monoxide ratio (molar ratio) in the raw material gas be 0.5 to 4.0. It is desirable that the conversion rate of carbon monoxide be not less than 50% from the viewpoint of the production efficiency of the FT synthetic oil.

Inside of the bubble column type slurry bed reactor C2, a slurry in which the FT synthesis catalyst particles are suspended in the liquid hydrocarbon (product of the FT synthesis reaction) is accommodated. The synthesis gas (CO and $H_2$) obtained in Step S1 is injected into the slurry within the reactor through a dispersion plate installed in the bottom of the bubble column type slurry bed reactor C2. The synthesis gas blown into the slurry becomes bubbles, which move upward in the slurry to the upper portion of the bubble column type slurry bed reactor C2. In the course thereof, the synthesis gas is dissolved in the liquid hydrocarbon to contact the FT synthesis catalyst particles; thereby, the FT synthesis reaction progresses to produce hydrocarbon. The FT synthesis reaction is represented by reaction equation (3) below, for example.

$$2nH_2 + nCO \rightarrow (-CH_2-)_n + nH_2O \quad (3)$$

A gaseous phase exists in the upper portion of the slurry accommodated in the bubble column type slurry bed reactor C2. The light hydrocarbon that is produced by the FT synthesis reaction and gaseous under the condition within the bubble column type slurry bed reactor C2 and the non-reacted synthesis gas (CO and $H_2$) move from the slurry phase to the gaseous phase portion, and are further evacuated from the top of the bubble column type slurry bed reactor C2 through the line L2. Then, by the gas liquid separator D2 including a cooler (not shown) and connected to the line L2, the evacuated light hydrocarbon and the non-reacted synthesis gas are separated into the gas content containing the non-reacted synthesis gas and hydrocarbon gas having $C_4$ or less as principal components and a liquid hydrocarbon (light hydrocarbon oil) liquefied by cooling. Of these, the gas content is recycled to the bubble column type slurry bed reactor C2, and the non-reacted synthesis gas contained in the gas content is fed to the FT synthesis reaction again. On the other hand, the light hydrocarbon oil is fed through a line L4 and a line L8 to the first rectifying column C4.

On the other hand, the hydrocarbon (heavy hydrocarbon oil) that is produced by the FT synthesis reaction and a liquid under the condition within the bubble column type slurry bed reactor C2 and the slurry containing the FT synthesis catalyst particles are fed from the central portion of the bubble column type slurry bed reactor C2 through the line L6 to the catalyst separator D4. The FT synthesis catalyst particles in the slurry are captured by the filter installed within the catalyst separator D4. The heavy hydrocarbon oil in the slurry passes through the filter to be separated from the FT synthesis catalyst particles, and is evacuated from the line L8 to merge with the light hydrocarbon oil from the line L4. The mixture of the heavy hydrocarbon oil and the light hydrocarbon oil is heated in a heat exchanger H2 installed halfway of the line L8, and then fed to the first rectifying column C4.

As the product of the FT synthesis reaction, the hydrocarbon (light hydrocarbon) that is gaseous under the condition within the bubble column type reactor C2 and the hydrocarbon (heavy hydrocarbon oil) that is a liquid under the condition within the bubble column type reactor C2 are obtained. These hydrocarbons are substantially normal paraffin, and few aromatic hydrocarbon, naphthene hydrocarbon and isoparaffin are contained. Distribution of the number of carbon atoms of the light hydrocarbon and heavy hydrocarbon oil in total widely ranges from $C_4$ or less as a gas at normal temperature to approximately $C_{80}$, for example, as a solid (wax) at room temperature. The product of the FT synthesis reaction also contains olefins and oxygen-containing compounds containing oxygen atoms derived from carbon monoxide (e.g., alcohols) as a by-product.

If the opening of the filter that the catalyst separator D4 includes is smaller than the particle size of the FT synthesis catalyst particle, the size of the opening is not particularly limited, preferably 10 to 20 μm, and more preferably 10 to 15 μm. The FT synthesis catalyst particles captured by the filter that the catalyst separator D4 includes are re-introduced through the line L10 into the bubble column type reactor C2 by properly flowing (backwashing) the liquid hydrocarbon in a direction opposite to the ordinary flow direction, and re-used.

Part of the FT synthesis catalyst particles that flow as the slurry in the bubble column type slurry bed reactor C2 wear or collapse due to friction between the catalyst particles, friction with the wall of the apparatus or the heat conducting pipe provided within the reactor for cooling, or damages or the like caused by the reaction heat to produce the catalyst fine powder. Here, the particle size of the catalyst fine powder is not particularly limited, and is a size such that the catalyst fine powder may pass through the filter that the catalyst separator D4 includes, namely, the particle size is equal to or smaller than the size of the opening of the filter. For example, in the case where the opening of the filter is 10 μm, a catalyst particle having a particle size of not more than 10 μm is referred to as the catalyst fine powder. The catalyst fine powder contained in the slurry passes through the filter with the heavy hydrocarbon oil, and fed to the first rectifying column C4.

(Step S3)

In Step S3, the hydrocarbon oil comprising the mixture of the light hydrocarbon oil and heavy hydrocarbon oil fed from the bubble column type slurry bed reactor C2 (FT synthetic oil) is fractionated in the first rectifying column C4. By the fractionation, the FT synthetic oil is separated into the crude naphtha fraction having approximately $C_5$ to $C_{10}$ whose boiling point is lower than approximately 150° C., the crude intermediate fraction having approximately $C_{11}$ to $C_{20}$ whose boiling point is approximately 150 to 360° C., and the crude wax fraction having approximately $C_{21}$ or more whose boiling point is approximately more than 360° C.

The crude naphtha fraction is evacuated through a line L20 connected to the column top of the first rectifying column C4. The crude intermediate fraction is evacuated through a line L18 connected to the central portion of a first rectifying column C4. The crude wax fraction is evacuated through the line L12 connected to the bottom of the first rectifying column C4.

The catalyst fine powder contained in the FT synthetic oil to be fed to the first rectifying column C4 does not accompany the distilled oil obtained by vaporization once and subsequent condensation within the first rectifying column C4 (crude naphtha fraction and crude intermediate fraction), and substantially accompanies only the crude wax fraction that is not vaporized within the first rectifying column C4 but kept in a liquid state to become the column bottom oil. Accordingly, the catalyst fine powder contained in the FT synthetic oil (the whole fractions) is to be condensed in the crude wax fraction.

(Step S4)

The line L12 connected to the column bottom of the first rectifying column C4 is connected to the mixing drum D6, and the mixing drum D6 and the hydrocracker C6 are connected to each other through the line L16. The line L12 and line L16 through the mixing drum D6 form the first transfer line. The line L14 is branched from the branching point on the line L12, and connected to the line L12 downstream of the branching point through the filter 2 for capturing the catalyst fine powder contained in the crude wax fraction. The line L14 and the filter 2 form the second transfer line.

It is preferable that the line L12 that forms the first transfer line (preferably a position downstream of the branching point from the line L14 and upstream of the merging point with the line L14) and the line L14 that forms the second transfer line each be provided with a flow meter, and it is more preferable that the flow meter be one that can measure a cumulative flow rate.

The first transfer line and the second transfer line include the flow meter; thereby, the amount of the catalyst fine powder flowed into the hydrocracker for a predetermined period can be estimated from the amount of catalyst fine powder captured by the filter provided in the second transfer line for the period, and the cumulative amount of the respective fluids flowed through the first transfer line and second transfer line for the period, by the method specifically described later.

It is preferable that the line L12 that forms the first transfer line (preferably the position downstream of the branching point of the line L14 and upstream of the merging point with the line L14) and the line L14 that forms the second transfer line (preferably upstream of the filter 2) be provided with a valve (not shown) for adjusting the respective flow rates of the crude wax fraction in the first transfer line and the second transfer line or closing the flow path.

By provision of the valve, the respective flow rates of the crude wax fraction in the first transfer line and the second transfer line can be adjusted, and the ratio of the flow rates in the first transfer line and the second transfer line can be used as a predetermined value. In replacement of the filter 2 or the like, the valve provided in the second transfer line L14 is closed to stop the flow of the crude wax fraction into the filter 2.

It is preferable that the production system 100 include a device that measures the differential pressure before and after the filter 2 such as a differential pressure gauge. The differential pressure means pressure loss in the filter 2. A large differential pressure indicates that openings of the filter 2 are clogged with the catalyst fine powder. Accordingly, the relationship between the amount of the catalyst fine powder captured by the filter 2 and the differential pressure before and after the filter 2 is found in advance; thereby, in the state where the filter 2 is installed in the second transfer line L14, the amount of the catalyst fine powder captured by the filter 2 can be estimated from the differential pressure. Thereby, without limitation to the point in time when the amount of the catalyst fine powder is measured with the filter 2 being dismounted, the amount of the catalyst fine powder captured by the filter 2 at any point in time can be estimated, and the cumulative amount of the catalyst fine powder to flow into the hydrocracker C6 from the start of operation to the point in time can be estimated. Further, when the differential pressure reaches the predetermined value, the filter 2 may be dismounted from the second transfer line L14 to be replaced by a new filter or a reproduced filter from which the captured catalyst fine powder is removed. Alternatively, the catalyst fine powder may be removed from the filter 2, and the filter 2 may be reinstalled in the second transfer line L14. Thereby, capturing of the catalyst fine powder by the filter and monitoring can be continued.

If the opening of the filter 2 is smaller than that of the filter provided within the catalyst separator D4, the opening of the filter 2 is not particularly limited, preferably less than 10 μm, and more preferably not more than 7 μm. As the opening of the filter 2 is smaller, the catalyst fine powder can be captured more securely, but the differential pressure of the filter 2 becomes larger. In order to secure the flow rate of the crude wax fraction in the second transfer line L14, the opening of the filter 2 is preferably not less than 1 μm, and may be not less than 5 μm.

As the filter 2, sintered metal filters such as metallic mesh sintered filters can be used, for example. The sintered metal filter is a filter produced by heating a metallic mesh, powder, and the like to a temperature lower than the melting point of the metal to bond these. The metallic mesh sintered filter is a filter obtained by layering a plurality of metallic meshes and sintering the layered metallic meshes in vacuum at a high temperature; according to the size of the opening of the metallic mesh and the number of the layered meshes, the diameter (opening) to be formed in the metallic mesh sintered filter can be adjusted. Particularly in the case where the flow rate of the fluid that flows through the second transfer line is small and a small filter is provided, the filter 2 may be a filter comprising a porous resin membrane such as a membrane filter.

In Step S4, at least part of the crude wax fraction flowed out of the column bottom of the first rectifying column C4 through the line L12 is flowed into the second transfer line L14, and the catalyst fine powder in the crude wax fraction that flows through the second transfer line L14 is continuously captured by the filter 2. On the other hand, the remaining crude wax fraction is transferred to the hydrocracker C6 through the path from the first transfer line, i.e., the line L12 through the mixing drum D6 and the line L16. The crude wax fraction from which the catalyst fine powder is captured by the filter 2 merges with the crude wax fraction that flows through the second transfer line L14 into the first transfer line L12.

The catalyst fine powder in crude wax fraction that flows through the second transfer line is continuously captured by the filter 2; thereby, the amount of the catalyst fine powder to flow into the hydrocracker C6 can be reduced. Thereby, deterioration of the hydrocracking catalyst used in Step S5 (hydrocracking) by the catalyst fine powder can be prevented or suppressed, and increase in the differential pressure in the hydrocracker C6 can also be prevented or suppressed. As a result, the hydrocracker C6 can also be stably continuously operated for a long time.

In the present embodiment, the FT synthetic oil in which the catalyst fine powder is mixed is fractionated in the first rectifying column C4, the filter is provided one of the two transfer lines through which the crude wax fraction in which the catalyst fine powder obtained by the fractionation is condensed flows, and the catalyst fine powder is captured by the filter thereby to remove at least part of the catalyst fine powder; accordingly, the flow rate of the fluid that flows through the filter is reduced, for example, compared with the case where the filter is provided in the line L8 that feeds the FT synthetic oil to the first rectifying column C4, and the catalyst fine powder mixed in the FT synthetic oil is removed by the filter. If the flow rate of the fluid that flows through the filter is reduced, the differential pressure in the filter can be reduced, and operation of the hydrocarbon oil production system 100 is easier. In addition, if the flow rate of the fluid that flows through the filter is reduced, the size of the filter, for example, the area that the fluid passes through can be reduced, leading to reduction in facility cost and easier operation such as replacement of the filter.

Step S4 further comprises a step of monitoring the amount of the catalyst fine powder captured by the filter 2. Here, "monitoring the amount of the catalyst fine powder captured" means that in the case of replacement of the filter 2 or the like, the amount of the catalyst fine powder captured by the filter used so far is measured; or the differential pressure before and after the filter 2 is measured with the filter being mounted, the correlation between the differential pressure and the amount of the catalyst fine powder captured by the filter is found in advance, and the amount of the catalyst fine powder captured is estimated from the correlation with the differential pressure.

Examples of the conventional method for capturing the state of mixing of the catalyst fine powder in the FT synthetic oil include a method in which the FT synthetic oil containing the catalyst fine powder is periodically or properly extracted, and the amount of the catalyst fine powder contained therein is measured. However, the amount of the catalyst fine powder to be mixed in the FT synthetic oil is slight and the amount of mixing fluctuates over time, while frequency of measurement is limited in the conventional method; accordingly, it is difficult to capture the cumulative amount of the catalyst fine powder mixed in the FT synthetic oil for a predetermined period to be flowed into the upgrading step with high precision.

On the other hand, in the method for producing a hydrocarbon oil according to the present embodiment, the amount of the catalyst fine powder captured by the filter 2 is monitored; thereby, the cumulative amount of the catalyst fine powder flowed into the hydrocracker C6 can be estimated with high precision. In the case of using the method in which the amount of the catalyst fine powder captured by the filter 2 is estimated by the differential pressure of the filter 2, the cumulative amount of the catalyst fine powder to flow into the hydrocracker C6 at any point in time is estimated.

The method for measuring the amount of the catalyst fine powder captured by the filter 2 dismounted from the second transfer line for replacement or the like is not limited; for example, a method is used in which the dismounted filter 2 is washed by a solvent with a low boiling point in which the wax fraction is dissolved, thereby to remove the adhering wax fraction; further, the solvent is removed by heating, reduction of pressure, or the like, and then the mass of the filter in which only the catalyst fine powder remains is measured; the mass of the catalyst fine powder captured is calculated from the difference between the measured mass and the mass of only the filter measured in advance. In the case where the filter is formed from a material such as a metal or ceramic, the wax fraction adhering to the filter may be removed by burning, and then the mass of the filter on which only the catalyst fine powder remains may be measured, and the mass of the catalyst fine powder captured may be calculated from the difference between the measured mass and the mass of only the filter measured in advance. Alternatively, in the case where the filter is a filter formed from a material that can be burned and causes no burning residue such as an organic polymer, the filter itself may be burned, and the amount of the catalyst fine powder may be determined as ash.

The filter 2 subjected to the measurement of the amount of the catalyst fine powder captured may be subjected to a reproduction treatment to remove the captured catalyst fine powder, and re-used. As the method for removing the captured catalyst fine powder from the filter 2, a method for scraping the adhering catalyst fine powder, or a method for flowing a fluid in a direction opposite to the flow direction in use under pressure using a predetermined apparatus is used, for example.

On the other hand, in the method in which the correlation between the differential pressure before and after the filter 2 and the amount of the catalyst fine powder captured is found in advance, and the amount of the catalyst fine powder captured is estimated from the correlation with the differential pressure, the data on the amount of the catalyst fine powder captured by the filter 2 measured by the method and the data on the differential pressure just before the filter 2 is dismounted are accumulated, and the correlation therebetween is found. If the correlation is found, without dismounting the filter 2 to measure the amount of the catalyst fine powder captured, the amount of the catalyst fine powder captured by the filter 2 can be estimated from the differential pressure before and after the filter 2 while the capturing by the filter is continued. In the case where the flow rate of the crude wax in the second transfer line in which the filter 2 is provided fluctuates, it is preferable that the flow rate be measured in order to correct the influence by fluctuation of the differential pressure due to the flow rate.

Hereinafter, in the present embodiment, operation to monitor the amount of the catalyst fine powder captured by the filter 2 thereby to estimate and monitor the state of the catalyst fine powder flowing into the hydrocracker C6 will be specifically described.

A case is assumed in which the hydrocracking catalyst to be filled in the hydrocracker C6 is replaced by a new hydrocracking catalyst or a reproduced hydrocracking catalyst to start operation of the hydrocarbon oil production system 100. In this case, a new or reproduced (the captured catalyst fine powder is removed) filter 2 is mounted on the second transfer line L14, and monitoring of the catalyst fine powder flowing into the upgrading step is started at the same time of the start of operating the hydrocarbon oil production system 100. The crude wax fraction is flowed into the first transfer line L12 and the second transfer line L14 branched from the first transfer line L12 at respective predetermined flow rates. The amount of the catalyst fine powder to be captured by the filter 2 is increased with a lapse of time, and following this, the differential pressure before and after the filter 2 is increased. When the differential pressure before and after the filter 2 is increased to a predetermined value, the valve provided in the second transfer line L14 is closed to temporarily stop the flow of the crude wax into the second transfer line L14; the filter 2 is dismounted, and a new filter is mounted to resume the flow of the crude wax fraction into the second transfer line L14. The amount of the catalyst fine powder captured by the filter 2 dismounted at the time of replacement of the filter is measured by the method above, and the obtained amount of the catalyst fine powder captured (mass) is defined as $w_1$. Then, the amount (mass) of the catalyst fine powder $W_1$ estimated to flow into the hydrocracker C6 from the start of operating the hydrocarbon oil production system 100 to the time of replacement of the filter 2 is represented by equation A. The cumulative mass flow rate of the crude wax fraction flowed through the first transfer line L12 for a period from the start of operating the hydrocarbon oil production system 100 to replacement of the filter 2 is defined as $Sa_1$, and the cumulative mass flow rate of the crude wax fraction flowed through the second transfer line L14 is defined as $Sb_1$.

$$W_1 = w_1 \times (Sa_1/Sb_1) \tag{A}$$

After replacement of the filter 2, when the differential pressure before and after the filter 2 is increased with the time by capturing the catalyst fine powder to reach the predetermined value, replacement of the filter 2 and measurement of the amount of the catalyst fine powder captured are performed by the same operation as before. Then, wherein the amount (mass) of the catalyst fine powder captured by the dismounted filter 2 is defined as $w_2$, the cumulative mass flow rate of the crude wax fraction flowed through the first transfer line L12 for a period from the last replacement of the filter 2 to the replacement this time is defined as $Sa_2$, and the cumulative mass flow rate of the crude wax fraction flowed through the second transfer line L14 is defined as $Sb_2$, the amount (mass) of the catalyst fine powder $W_2$ flowed into the hydrocracker C6 for the period is represented by equation B.

$$W_2 = w_2 \times (Sa_2/Sb_2) \tag{B}$$

Hereinafter, this is repeated, and the amount of the catalyst fine powder captured by the filter 2 between one replacement and the next replacement of the filter is integrated; thereby, the estimated cumulative amount W of the catalyst fine powder that flows into the hydrocracker C6 for the period from the start of operating the hydrocarbon oil production system 100 to the closest time of replacement of the filter can be calculated. Namely, W is calculated by equation C.

$$W = W_1 + W_2 + \tag{C}$$

The cumulative amount of the catalyst fine powder that flows into the hydrocracker C6 may also be estimated not only by measuring the amount of the catalyst fine powder captured by the filter 2, but also using a method for estimating the captured amount from the differential pressure of the filter 2. Alternatively, by a combination of the method for measuring the amount of the catalyst fine powder and the method for estimating the captured amount from the differential pressure, the estimated cumulative amount of the catalyst fine powder that flows into the hydrocracker C6 at any point in time from the start of operating the hydrocarbon oil production system 100 can be calculated.

The ratio F2/F1 of the mass flow rate (F2) of the crude wax fraction that flows through the second transfer line to the mass flow rate (F1) of the crude wax fraction that flows through the first transfer line is not limited; as the F2/F1 is larger, the ratio of the catalyst fine powder captured and removed by the filter 2 is larger, and the amount of the catalyst fine powder that flows into the hydrocracker C6 is reduced. On the other hand, as the F2/F1 is larger, the differential pressure before and after the filter 2 and the rate of increasing the differential pressure by capturing the catalyst fine powder is larger, and the frequency of replacement of the filter 2 is increased. Moreover, the size of the filter 2, for example, the area in which the crude wax flows needs to be increased, facility cost is increased, and replacement operation of the filter is complicated. Accordingly, it is preferable that the F2/F1 be determined considering a degree of mixing of the catalyst fine powder in the FT synthetic oil, the occurrence of problems caused by the catalyst fine powder flowing into the hydrocracker C6, complicatedness of replacement operation of the filter 2, and cost needed therefor.

In the present embodiment, the F2/F1 may be 0.001 to 0.2. In the case where the F2/F1 is 0.001 to 0.2, the detachable filter 2 provided halfway of the second transfer line can be smaller, and facility cost of the filter 2 can be reduced. Moreover, the complicatedness in replacement of the filter 2 can be reduced, and replacement of the filter 2 can be performed with a high frequency. Furthermore, the time needed for replacement of the filter 2 can be reduced, and the time in which the monitoring of the catalyst fine powder flowing into the hydrocracker C6 is halted can be reduced. Moreover, by making the filter 2 smaller, operation to determine the amount of the catalyst fine powder captured by the filter 2 is easier. Namely, the operation to wash the crude wax fraction adhering to the dismounted filter 2 by a solvent or burn that for removal, the operation to weigh the filter 2, and the like can be performed in a facility for performing ordinary quality management, or a facility to perform a chemical test depending on the cases. Thereby, without a hitch in operation of the system 100 for producing a hydrocarbon oil, the state of the catalyst fine powder flowing into the hydrocracker C6 can be highly accurately monitored at low cost and with simple operation all the time.

In Step S4, a threshold of the cumulative amount of the catalyst fine powder to flow into the hydrocracker C6 when the activity of the hydrocracking catalyst to be filled into the hydrocracker C6 is remarkably reduced may be found in advance. Moreover, a threshold of the cumulative amount of the catalyst fine powder to flow into the hydrocracker C6 when serious increase in the differential pressure in the hydrocracker C6 occurs may be found in advance. For example, if the catalyst fine powder is accumulated within the hydrocracker C6, production of a carbonaceous substance (coke) using the catalyst fine powder as a nucleus is promoted; thereby, the activity of the hydrocracking catalyst may be reduced. Moreover, accumulation of the catalyst fine powder within the hydrocracker C6 may cause increase in the differential pressure in the hydrocracker C6. The occurrence of these problems tends to be remarkable when the cumulative amount of the catalyst fine powder flowed into the hydrocracker C6 exceeds a predetermined value. Then, the cumulative amount of the catalyst fine powder flowed into the hydrocracker C6 when the occurrence of problems in the hydrocracker C6 is remarkable, which is estimated from the amount of the catalyst fine powder captured by the filter 2, is found in advance, and the cumulative amount is defined as a threshold of the occurrence of problems in the hydrocracker C6. The amount of the catalyst fine powder captured by the filter 2 is monitored; thereby, at a stage in which the cumulative amount of the catalyst fine powder flowed into the hydrocracker C6 which is estimated from the amount of the catalyst fine powder captured is close to the threshold, measures against reduction in the activity of the hydrocracking catalyst in the hydrocracker C6 and/or increase in the differential pressure can be taken in advance. Namely, in the present embodiment, prediction of the occurrence of problems attributed to the catalyst fine powder can be performed and precautionary measures based on the prediction can be taken.

Moreover, even before the stage in which the cumulative amount is close to the threshold, in the case where the amount of the catalyst fine powder to flow into the hydrocracker C6 is determined to be large based on the monitoring of the amount of the catalyst fine powder captured by the filter 2 according to the present embodiment, the precautionary measures can be taken.

As the precautionary measures, for example, the ratio F2/F1 of the mass flow rate (F2) of the crude wax fraction that flows through the second transfer line to the mass flow rate (F1) of the crude wax fraction that flows through the first transfer line in the present embodiment may be increased, and the amount of the catalyst fine powder to be captured and removed by the filter 2 may be increased.

Moreover, examples of the precautionary measures include a method in which a facility is operated to remove the catalyst fine powder to flow into the hydrocracker C6 or reduce the amount thereof in the case where in the production system 100, the facility for performing a step of removing at least part of the catalyst fine powder contained in the crude wax fraction is provided separated from that of capturing the catalyst fine powder by the filter 2 according to the present embodiment. Examples of the step of removing at least part of the catalyst fine powder contained in the crude wax fraction, separated from that of capturing the catalyst fine powder by the filter 2, include a step of feeding at least part of the crude wax fraction that flows out from the first rectifying column C4 to a storage tank or the like to separate and capture the catalyst fine powder by sedimenting, or a step of centrifuging at least part of the crude wax fraction to separate and capture the catalyst fine powder. The facility to perform these steps may be operated at the same time as the start of operating the production system 100, or the operation may be started at the stage mentioned above based on the monitoring of the amount of the catalyst fine powder to be captured by the filter 2 according to the present embodiment.

In the present embodiment, the line L14 branched from the branching point on the line L12 and connected through the filter 2 to the line L12 downstream of the branching point is the second transfer line; a line L14a branched from the branching point on the line L16 connecting the mixing drum D6 to the hydrocracker C6, provided with a detachable filter 2a halfway, and connected to the line L16 downstream of the branching point may be provided, and the line L14a may be the second transfer line instead of the line L14. In this case, the catalyst fine powder in the crude wax fraction is captured by the filter 2a to monitor the amount of the catalyst fine powder to be captured. The total flow rate of the fluid to flow through the line L16 and the line L14a is larger than the total flow rate of the crude wax fraction to flow through the line L12 and the line L14 because the column bottom oil of the second rectifying column C12 to be recycled from the second rectifying column C12 is added to the crude wax fraction from the first rectifying column C4. Because the differential pressure of the filter is increased with increase in the flow rate, an embodiment in which the line L12 is the first transfer line, and the line L14 is the second transfer line is preferable. Moreover, the production system 100 may include all the line L14, the filter 2, the line L14a, and the filter 2a.

(Step S5)

The crude wax fraction transferred from the first rectifying column C4 in Step S4, with hydrogen gas fed by a feed line of the hydrogen gas (not shown) connected to the line L16, is heated to the temperature needed for hydrocracking of the crude wax fraction by a heat exchanger H4 installed halfway of the line L16, and then fed to the hydrocracker C6 to be hydrocracked. The crude wax fraction not sufficiently hydrocracked in the hydrocracker C6 (hereinafter, referred to as the "uncracked wax fraction" in some cases) is recovered as the column bottom oil of the second rectifying column C12 in Step S8, recycled by a line L38 to the line L12, mixed with the crude wax fraction from the first rectifying column C4 in the mixing drum D6, and fed to the hydrocracker C6 again.

The type of the hydrocracker C6 is not particularly limited, and a fixed bed flow reactor filled with a hydrocracking catalyst is preferably used. The reactor may be singular, or a plurality of reactors may be provided in serial or in parallel. Moreover, the catalyst bed within the reactor may be singular or plural.

As the hydrocracking catalyst filled in the hydrocracker C6, a known hydrocracking catalyst is used, and a catalyst in which a metal that is an element having hydrogenation activity and belongs to Group 8 to Group 10 in the periodic table is supported by an inorganic carrier having a solid acidity is preferably used.

Examples of the inorganic carrier that forms the hydrocracking catalyst and has suitable solid acidity include those comprising zeolites such as ultra stable Y-type (USY) zeolite, Y-type zeolite, mordenite, and β zeolite, and one or more inorganic compounds selected from amorphous composite metal oxides having heat resistance such as silica alumina, silica zirconia, and alumina boria. Further, as the carrier, compositions comprising USY zeolite, and one or more amorphous composite metal oxides selected from silica alumina, alumina boria, and silica zirconia are more preferable, and compositions comprising USY zeolite and alumina boria and/or silica alumina are still more preferable.

USY zeolite is one obtained by ultra-stabilizing Y-type zeolite by a hydrothermal treatment and/or acid treatment; in addition to the micro fine porous structure called micro fine pores that Y-type zeolite originally has and whose pore size is not more than 2 nm, new fine pores having a pore size in the range of 2 to 10 nm are formed in USY zeolite. The average particle size of USY zeolite is not particularly limited, preferably not more than 1.0 μm, and more preferably not more than 0.5 μm. Moreover, in USY zeolite, it is preferable that the molar ratio of silica/alumina (molar ratio of silica to alumina) be 10 to 200, and it is more preferable that the molar ratio be 15 to 100, and it is still more preferable that the molar ratio be 20 to 60.

Moreover, it is preferable that the carrier contain 0.1 to 80% by mass of crystalline zeolite and 0.1 to 60% by mass of amorphous composite metal oxide having heat resistance.

The carrier can be produced as follows: a carrier composition comprising the inorganic compound having solid acidity and a binder is molded, and fired. The proportion of the inorganic compound having solid acidity to be blended is preferably 1 to 70% by mass, and more preferably 2 to 60% by mass based on the whole mass of the carrier. Moreover, in the case where the carrier contains USY zeolite, the proportion of USY zeolite to be blended is preferably 0.1 to 10% by mass, and more preferably 0.5 to 5% by mass based on the whole mass of the carrier. Further, in the case where the carrier contains USY zeolite and alumina boria, it is preferable that the proportion of USY zeolite to alumina boria to be blended (USY zeolite/alumina boria) be 0.03 to 1 in the mass ratio. Moreover, in the case where the carrier contains USY zeolite and silica alumina, it is preferable that the proportion of USY zeolite to silica alumina to be blended (USY zeolite/silica alumina) be 0.03 to 1 in the mass ratio.

The binder is not particularly limited; alumina, silica, titania, magnesia are preferable, and alumina is more preferable. The amount of the binder to be blended is preferably 20 to 98% by mass, and more preferably 30 to 96% by mass based on the whole mass of the carrier.

The temperature in firing the carrier composition is preferably in the range of 400 to 550° C., more preferably in the range of 470 to 530° C., and still more preferably in the range of 490 to 530° C. Firing at such a temperature can give sufficient solid acidity and mechanical strength to the carrier.

Examples of Groups 8 to 10 metals in the periodic table supported by the carrier and having hydrogenation activity specifically include cobalt, nickel, rhodium, palladium, iridium, and platinum. Among these, metals selected from nickel, palladium, and platinum are preferably used singly or in combinations of two or more. These metals can be supported on the carrier mentioned above by a standard method such as impregnation and ion exchange. The amount of the metal to be supported is not particularly limited, and it is preferable that the total amount of the metal be 0.1 to 3.0% by mass based on the mass of the carrier. Here, the periodic table of the elements refers to the long form of the periodic table of the elements based on the specification by IUPAC (the International Union of Pure and Applied Chemistry).

In the hydrocracker C6, the crude wax fraction and part of the uncracked wax fraction (hydrocarbons having approximately $C_{21}$ or more) is converted into hydrocarbons having approximately $C_{20}$ or less by hydrocracking; further, part thereof is converted into naphtha fraction (approximately $C_5$ to $C_{10}$) lighter than the target intermediate fraction (approximately $C_{11}$ to $C_{20}$) and further gaseous hydrocarbons having $C_4$ or less by excessive cracking. On the other hand, the crude wax fraction and part of the uncracked wax fraction are not subjected to sufficiently hydrocracking, and become the uncracked wax fraction having approximately $C_{21}$ or more. The composition of the hydrocracking product is determined according to the hydrocracking catalyst to be used and the hydrocracking reaction condition. Here, the "hydrocracking product" refers to all hydrocracking products containing the uncracked wax fraction, unless otherwise specified. If the hydrocracking reaction condition is tighter than necessary, the content of the uncracked wax fraction in the hydrocracking product is reduced while the light content which weight is equal to or lighter than the naphtha fraction is increased to reduce yield of the target intermediate fraction. On the other hand, if the hydrocracking reaction condition is milder than necessary, the uncracked wax fraction is increased to reduce yield of the intermediate fraction. In the case where the ratio M2/M1 of the mass M2 of the cracked product whose boiling point is 25 to 360° C. to the mass M1 of all cracked products whose boiling point is not less than 25° C. is defined as a "cracking rate," the reaction condition is selected so that the cracking ratio M2/M1 may be usually 20 to 90%, preferably 30 to 80%, more preferably 45 to 70%.

In the hydrocracker C6, in parallel with the hydrocracking reaction, a hydrogenation isomerization reaction of normal paraffin that includes the crude wax fraction and uncracked wax fraction or hydrocracking products thereof progresses to produce isoparaffin. In the case where the hydrocracking product is used as the fuel oil base material, isoparaffin to be produced by the hydrogenation isomerization reaction is a component that makes contribution to improvement in fluidity at a low temperature, and it is preferable that the production rate be high. Further, removal of olefins and oxygen-containing compounds such as alcohols that are by-products of the FT synthesis reaction contained in the crude wax fraction also progresses. Namely, the olefins are converted into paraffin hydrocarbons by hydrogenation, and the oxygen-containing compounds are converted into paraffin hydrocarbon and water by hydrodeoxidation.

The reaction condition in the hydrocracker C6 is not limited, and the following reaction condition can be selected. Namely, examples of the reaction temperature include 180 to 400° C.; 200 to 370° C. is preferable, 250 to 350° C. is more preferable, and 280 to 350° C. is particularly preferable. At a reaction temperature more than 400° C., not only does cracking into the light content tend to progress to reduce the yield of the intermediate fraction, but the product tends to be colored to limit use as the fuel oil base material. On the other hand, at a reaction temperature less than 180° C., not only does the hydrocracking reaction tend not to sufficiently progress to reduce the yield of the intermediate fraction, but production of isoparaffin by the hydrogenation isomerization reaction tends to be suppressed, and the oxygen-containing compounds such as alcohols tend not to be sufficiently removed to remain. Examples of the hydrogen partial pressure include 0.5 to 12 MPa, and 1.0 to 5.0 MPa is preferable. At a hydrogen partial pressure less than 0.5 MPa, hydrocracking, hydrogenation isomerization and the like tend not to sufficiently progress; on the other hand, at a hydrogen partial pressure more than 12 MPa, high pressure resistance is demanded of the apparatus, and facility cost tends to be increased. Examples of the liquid hourly space velocity (LHSV) of the crude wax fraction and uncracked wax fraction include 0.1 to 10.0 $h^{-1}$, and 0.3 to 3.5 $h^{-1}$ is preferable. At an LHSV less than 0.1 $h^{-1}$, hydrocracking tends to excessively progress, and productivity tends to be reduced; on the other hand, at an LHSV more than 10.0 $h^{-1}$, hydrocracking, hydrogenation isomerization and the like tend not to sufficiently progress. Examples of the ratio of hydrogen/oil include 50 to 1000 NL/L, and 70 to 800 NL/L is preferable. At a ratio of hydrogen/oil less than 50 NL/L, hydrocracking, hydrogenation isomerization and the like tend not to sufficiently progress; on the other hand, at a ratio of hydrogen/oil more than 1000 NL/L, a large-sized hydrogen feeding apparatus or the like tends to be needed.

In this example, the hydrocracking product and non-reacted hydrogen gas flowed from the hydrocracker C6 are cooled, and separated into gas and liquid at two stages by a gas liquid separator D8 and a gas liquid separator D10, the relatively heavy liquid hydrocarbon containing the uncracked wax fraction is obtained from the gas liquid separator D8, and the gas content mainly containing hydrogen gas and gaseous hydrocarbons having $C_4$ or less and the relatively light liquid hydrocarbon are obtained from the gas liquid separator D10. By such two-stage cooling and gas liquid separation, the occurrence of clogging of the line accompanied by solidification by rapid cooling of the uncracked wax fraction contained in the hydrocracking product can be prevented. The liquid hydrocarbons each obtained in the gas liquid separator D8 and the gas liquid separator D10 merge with a line L32 through a line L28 and a line L26, respectively. The gas content separated in the gas liquid separator D12 and mainly containing hydrogen gas and gaseous hydrocarbon with $C_4$ or less is fed to the intermediate fraction hydrorefining apparatus C8 and the naphtha fraction hydrorefining apparatus C10 through a line (not shown) connecting the gas liquid separator D10 to the line L18 and the line L20, and hydrogen gas is re-used.

(Step S6)

The crude intermediate fraction evacuated from the first rectifying column C4 through the line L18, with the hydrogen gas fed by a feed line of the hydrogen gas connected to the line L18 (not shown), is heated to the temperature needed for hydrorefining of the crude intermediate fraction by a heat exchanger H6 installed in the line L18, and then fed to the intermediate fraction hydrorefining apparatus C8 to be hydrorefined.

The type of the intermediate fraction hydrorefining apparatus C8 is not particularly limited, and a fixed bed flow reactor filled with a hydrorefining catalyst is preferably used. The reactor may be singular, or a plurality of reactors may be provided in serial or in parallel. Moreover, the catalyst bed within the reactor may be singular or plural.

As the hydrorefining catalyst used in the intermediate fraction hydrorefining apparatus C8, catalysts usually used for hydrorefining and/or hydrogenation isomerization in petroleum refining or the like, namely, the catalysts in which a metal having hydrogenation activity is supported by an inorganic carrier can be used.

As the metal having hydrogenation activity that forms the hydrorefining catalyst, one or more metals selected from the group consisting of metals in Groups 6, 8, 9, and 10 in the periodic table of the elements are used. Specific examples of these metals include noble metals such as platinum, palladium, rhodium, ruthenium, iridium, and osmium, or cobalt, nickel, molybdenum, tungsten, and iron; preferable are platinum, palladium, nickel, cobalt, molybdenum, and tungsten, and more preferable are platinum and palladium.

Moreover, two or more of these metals are also preferably used in combination; examples of a preferable combination in this case include platinum-palladium, cobalt-molybdenum, nickel-molybdenum, nickel-cobalt-molybdenum, and nickel-tungsten.

Examples of the inorganic carrier that forms the hydrorefining catalyst include metal oxides such as alumina, silica, titania, zirconia, and boria. These metal oxides may be used alone, or used as a mixture of two or more thereof, or a composite metal oxide such as silica alumina, silica zirconia, alumina zirconia, and alumina boria. From the viewpoint of efficiently progressing hydrogenation isomerization of normal paraffin at the same time of hydrorefining, it is preferable that the inorganic carrier be a composite metal oxide having solid acidity such as silica alumina, silica zirconia, alumina zirconia, and alumina boria. Moreover, a small amount of zeolite may be contained in the inorganic carrier. Further, in order to improve the moldability and mechanical strength of the carrier, a binder may be blended in the inorganic carrier. Examples of a preferable binder include alumina, silica, and magnesia.

In the case where the metal is the noble metal, it is preferable that the content of the metal having hydrogenation activity in the hydrorefining catalyst be approximately 0.1 to 3% by mass as the metal atom based on the mass of the carrier. Moreover, in the case where the metal is a metal other than the noble metal, it is preferable that the content be approximately 2 to 50% by mass as metal oxide based on the mass of the carrier. In the case where the content of the metal having hydrogenation activity is less than the lower limit value, hydrorefining and hydrogenation isomerization tend not to sufficiently progress. On the other hand, in the case where the content of the metal having hydrogenation activity is more than the upper limit value, dispersion of the metal having hydrogenation activity tends to be reduced to reduce the activity of the catalyst, and cost of the catalyst is increased.

In the intermediate fraction hydrorefining apparatus C8, the crude intermediate fraction (normal paraffin with approximately $C_{11}$ to $C_{20}$ is a principal component) is hydrorefined. In the hydrorefining, olefins that are a by-product of the FT synthesis reaction contained in the crude intermediate fraction are hydrogenated to be converted into paraffin hydrocarbon. Moreover, oxygen-containing compounds such as alcohols are converted into paraffin hydrocarbon and water by hydrodeoxidation. Moreover, in parallel with hydrorefining, the hydrogenation isomerization reaction of normal paraffin that forms the crude intermediate fraction progresses to produce isoparaffin. In the case where the intermediate fraction is used as the fuel oil base material, the isoparaffin produced by the hydrogenation isomerization reaction is a component that makes contribution to improvement in fluidity at a low temperature, and it is preferable that the production rate be high.

The reaction condition in the intermediate fraction hydrorefining apparatus C8 is not limited, and the following reaction condition can be selected. Namely, examples of the reaction temperature include 180 to 400° C., 200 to 370° C. is preferable, 250 to 350° C. is more preferable, and 280 to 350° C. is particularly preferable. At a reaction temperature more than 400° C., cracking into the light content tends to progress to reduce the yield of the intermediate fraction, and the product tends to be colored to limited use as fuel oil base material. On the other hand, at a reaction temperature less than 180° C., oxygen-containing compounds such as alcohols tend not to sufficiently be removed to remain, and production of isoparaffin by the hydrogenation isomerization reaction tends to be suppressed. Examples of the hydrogen partial pressure include 0.5 to 12 MPa, and 1.0 to 5.0 MPa is preferable. At a hydrogen partial pressure less than 0.5 MPa, hydrorefining and hydrogenation isomerization tend not to sufficiently progress; on the other hand, at a hydrogen partial pressure more than 12 MPa, high pressure resistance is demanded of the apparatus, and facility cost tends to be increased. Examples of the liquid hourly space velocity (LHSV) of the crude intermediate fraction include 0.1 to 10.0 $h^{-1}$, and 0.3 to 3.5 $h^{-1}$ is preferable. At an LHSV less than 0.1 $h^{-1}$, cracking into the light content tends to progress to reduce the yield of the intermediate fraction, and productivity tends to be reduced; on the other hand, at an LHSV more than 10.0 $h^{-1}$, hydrorefining and hydrogenation isomerization tend not to sufficiently progress. Examples of the ratio of hydrogen/oil include 50 to 1000 NL/L, and 70 to 800 NL/L is preferable. At a ratio of hydrogen/oil less than 50 NL/L, hydrorefining and hydrogenation isomerization tend not to sufficiently progress; on the other hand, at a ratio of hydrogen/oil more than 1000 NL/L, a large-sized hydrogen feeding apparatus and the like tend to be needed.

After the gas content mainly containing the non-reacted hydrogen gas is separated in the gas liquid separator D12 to which a line L30 is connected, an outflow oil of the intermediate fraction hydrorefining apparatus C8 is transferred through the line L32 to merge with the hydrocracking product of the liquid wax fraction transferred by the line L26. The gas content separated in the gas liquid separator D12 and mainly containing hydrogen gas is fed to the hydrocracker C6, and re-used.

(Step S7)

The crude naphtha fraction evacuated from the first rectifying column C4 by the line L20, with the hydrogen gas fed by a feed line of the hydrogen gas (not shown) connected to the line L20, is heated to the temperature needed for hydrorefining of the crude naphtha fraction by a heat exchanger H8 installed in the line L20, and fed to the naphtha fraction hydrorefining apparatus C10 to be hydrorefined.

The type of the naphtha fraction hydrorefining apparatus C10 is not particularly limited, and a fixed bed flow reactor filled with a hydrorefining catalyst is preferably used. The reactor may be singular, or a plurality of reactors may be provided in serial or in parallel. Moreover, the catalyst bed within the reactor may be singular or plural.

The hydrorefining catalyst used for the naphtha fraction hydrorefining apparatus C10 is not particularly limited, and the hydrorefining catalyst may be the same hydrorefining catalyst as that used for hydrorefining of the crude intermediate fraction.

In the naphtha fraction hydrorefining apparatus C10, unsaturated hydrocarbon contained in the crude naphtha fraction (normal paraffin with approximately $C_5$ to $C_{10}$ is a principal component.) is converted into paraffin hydrocarbon by hydrogenation. Moreover, the oxygen-containing compounds contained in the crude naphtha fraction such as alcohols are converted into paraffin hydrocarbon and water by hydrodeoxidation. In the naphtha fraction, the hydrogenation isomerization reaction does not progress much because the number of carbon atoms is small.

The reaction condition in the naphtha fraction hydrorefining apparatus C10 is not limited, and the same reaction condition as that in the intermediate fraction hydrorefining apparatus C8 can be selected.

The outflow oil of the naphtha fraction hydrorefining apparatus C10 is fed through a line L34 to a gas liquid separator D14; in the gas liquid separator D14, the outflow oil is separated into the gas content in which hydrogen gas is a principal component, and liquid hydrocarbon. The separated gas content is fed to the hydrocracker C6, and hydrogen gas contained in this is re-used. On the other hand, the separated liquid hydrocarbon is transferred through a line L36 to the naphtha stabilizer C14. Moreover, part of the liquid hydrocarbon is recycled through a line L48 to the line L20 upstream of the naphtha fraction hydrorefining apparatus C10. Because the amount of heat to be produced in hydrorefining of the crude naphtha fraction (hydrogenation of olefins and hydrodeoxidation of alcohols and the like) is large, part of the liquid hydrocarbon is recycled to the naphtha fraction hydrorefining apparatus C10 and the crude naphtha fraction is diluted; thereby, increase in the temperature in the naphtha fraction hydrorefining apparatus C10 is suppressed.

In the naphtha stabilizer C14, the liquid hydrocarbon fed from the naphtha fraction hydrorefining apparatus C10 and the second rectifying column C12 is fractionated to obtain refined naphtha with carbon atoms of $C_5$ to $C_{10}$ as a product. The refined naphtha is transferred from the column bottom of the naphtha stabilizer C14 through a line L46 to a naphtha tank T6, and stored. On the other hand, from a line L50 connected to the column top of the naphtha stabilizer C14, hydrocarbon gas in which hydrocarbon with the number of carbon atoms of a predetermined number or less ($C_4$ or less) is a principal component is discharged. Because the hydrocarbon gas is not a target product, the hydrocarbon gas is introduced into an external burning facility (not shown) to be burned, and then discharged into the air.

(Step S8)

The mixed oil comprising the liquid hydrocarbon obtained from the outflow oil from the hydrocracker C6 and the liquid hydrocarbon obtained from the outflow oil from the intermediate fraction hydrorefining apparatus C8 is heated by a heat exchanger H10 provided in the line L32, and fed to the second rectifying column C12 to be fractionated into hydrocarbon having approximately $C_{10}$ or less, a kerosene fraction, a light oil fraction, and a uncracked wax fraction. In the hydrocarbon having approximately $C_{10}$ or less, the boiling point is lower than approximately 150° C.; the hydrocarbon is evacuated from the column top of the second rectifying column C12 by a line L44. In the kerosene fraction, the boiling point is approximately 150 to 250° C.; the kerosene fraction is evacuated from the central portion of the second rectifying column C12 by a line L42 to be stored in a tank T4. In the light oil fraction, the boiling point is approximately 250 to 360° C.; the light oil fraction is evacuated from a lower portion of the second rectifying column C12 by a line L40 to be stored in a tank T2. In the uncracked wax fraction, the boiling point exceeds approximately 360° C.; the uncracked wax fraction is evacuated from the column bottom of the second rectifying column C12 to be recycled by the line L38 to the line L12 upstream of the hydrocracker C6. The hydrocarbon having approximately $C_{10}$ or less evacuated from the column top of the second rectifying column C12 is fed by the lines L44 and L36 to the naphtha stabilizer, and fractionated with the liquid hydrocarbon fed from the naphtha fraction hydrorefining apparatus C10.

As above, the suitable embodiment of the method for producing a hydrocarbon oil and production system according to the present invention has been described, but the present invention will not be always limited to the embodiment described above.

For example, in the embodiment, as the GTL process, natural gas is used as the raw material for production of the synthesis gas, while a non-gaseous hydrocarbon raw material such as asphalt and a residue oil may be used, for example. Moreover, in the embodiment, fractionation into three fractions of the crude naphtha fraction, the crude intermediate fraction, and the crude wax fraction is performed in the first rectifying column C4, and the crude naphtha fraction and the crude intermediate fraction are hydrorefined in individual steps; however, fractionation into two fractions of a crude light fraction of the crude naphtha fraction and the crude intermediate fraction in combination and the crude wax fraction may be performed, and the crude light fraction may be hydrorefined in one step. Moreover, in the embodiment, the kerosene fraction and the light oil fraction are fractionated as separate fractions in the second rectifying column C12; however, these may be fractionated as one fraction (intermediate fraction).

Moreover, as described above, the method for producing a hydrocarbon oil according to the present invention may comprise a step of capturing catalyst fine powder by the filter 2 and/or the filter 2a (hereinafter, referred to as a "filter 2 and the like") and monitoring the amount of the catalyst fine powder to be captured, and besides this, a step of capturing and removing at least part of the catalyst fine powder contained in the crude wax fraction. Moreover, the system for producing a hydrocarbon oil according to the present invention may include a facility for capturing and removing at least part of the catalyst fine powder contained in the crude wax fraction besides that by the filter 2 and the like. Examples of a step of capturing and removing at least part of the catalyst fine powder contained in the crude wax fraction besides that by the filter 2 and the like include a step of separating catalyst fine powder in a storage tank by sedimenting and capturing the catalyst fine powder, and a step of separating catalyst fine powder by centrifugation and capturing the catalyst fine powder. In the case where these steps are provided, from the viewpoint of capturing the amount of the catalyst fine powder that remains in the crude wax fraction after the catalyst fine powder is captured and removed by these step, and flow into the hydrocracker C6, it is preferable that these steps be performed upstream of the step of capturing catalyst fine powder by the filter 2 and the like and monitoring the amount thereof to be captured according to the present embodiment. Moreover, these steps may be performed all the time, or performed in the case where the hydrocracking catalyst filled in the hydrocracker C6 is deteriorated by flow-in of the catalyst fine powder, or the differential pressure of the hydrocracker C6 is increased.

INDUSTRIAL APPLICABILITY

According to the present invention, the method for producing a hydrocarbon oil and the production system can be provided in which without having a large influence on operation of an apparatus for producing a hydrocarbon oil, the amount of the catalyst fine powder derived from the catalyst used for the Fischer-Tropsch synthesis reaction to flow into the reaction system in the upgrading step of the FT synthetic oil can be quantitatively captured with high precision, and the occurrence of problems in the reaction system in the step can be predicted.

REFERENCE SIGNS LIST 2,2a . . . Filter, C4 . . . First rectifying column, C6 . . . Hydrocracker, C8 . . . Intermediate fraction hydrorefining apparatus, C10 . . . Naphtha fraction hydrorefining apparatus, C12 . . . Second rectifying column, L12, L16 . . . First transfer line, L14, L14a . . . Second transfer line, 100 . . . System for producing hydrocarbon oil.

The invention claimed is:

1. A method for producing a hydrocarbon oil, comprising:
   obtaining a hydrocarbon oil containing a catalyst fine powder derived from a catalyst by a Fischer-Tropsch synthesis reaction using a slurry bed reactor in which the catalyst is suspended in a liquid hydrocarbon;
   fractionating the hydrocarbon oil into at least one distilled oil and a column bottom oil containing the catalyst fine powder using a rectifying column;
   flowing at least part of the column bottom oil through a second transfer line to capture, using a detachable filter, the catalyst fine powder in the column bottom oil that is flowing through the second transfer line,
   the second transfer line being branched from a branching point of a first transfer line, provided with the detachable filter at a halfway point, and connected to the first transfer line downstream of the branching point and
   the first transfer line not having a filter between the branching point and the point where the second transfer line is connected to the first transfer line downstream of the branching point;
   flowing the remaining column bottom oil through the first transfer line to transfer the column bottom oil to a hydrocracker in a transfer device comprising the first transfer line that connects a column bottom of the rectifying column to the hydrocracker;
   monitoring an amount of the catalyst fine powder captured by the filter; and
   hydrocracking the column bottom oil in the hydrocracker.

2. The method for producing a hydrocarbon oil according to claim 1, wherein a ratio F2/F1 of a mass flow rate F2 of the column bottom oil to be transferred by the second transfer line to a mass flow rate F1 of the column bottom oil to be transferred by the first transfer line is 0.01 to 0.2.

3. The method for producing a hydrocarbon oil according to claim 1, wherein monitoring comprises measuring the amount of catalyst fine powder captured by the filter.

4. The method for producing a hydrocarbon oil according to claim 1, wherein monitoring comprises calculating a difference in pressure before and after the filter, and estimating the amount of the catalyst fine powder captured by the filter based on the difference in pressure.

5. The method for producing a hydrocarbon oil according to claim 1, wherein the first transfer line does not contain a filter for monitoring an amount of the catalyst fine powder.

* * * * *